United States Patent
Autissier et al.

(10) Patent No.: US 10,532,914 B2
(45) Date of Patent: Jan. 14, 2020

(54) HOOKING DEVICE FOR LIFTING LOADS COMPRISING A SECURE RATCHET

(71) Applicant: INDRAERO-SIREN, Le Pechereau (FR)

(72) Inventors: Christophe Autissier, Briantes (FR); Guillaume Meyniel, Chateauroux (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 15/779,542

(22) PCT Filed: Nov. 25, 2016

(86) PCT No.: PCT/FR2016/053091
§ 371 (c)(1),
(2) Date: May 28, 2018

(87) PCT Pub. No.: WO2017/089722
PCT Pub. Date: Jun. 1, 2017

(65) Prior Publication Data
US 2018/0370772 A1 Dec. 27, 2018

(30) Foreign Application Priority Data
Nov. 27, 2015 (FR) ...................... 15 61493

(51) Int. Cl.
*B66C 1/36* (2006.01)
(52) U.S. Cl.
CPC ...................... *B66C 1/36* (2013.01)
(58) Field of Classification Search
CPC ........................................................ B66C 1/36
USPC ................ 294/82.2, 82.34, 66.1, 202, 82.33
See application file for complete search history.

(56) References Cited

U.S. PATENT DOCUMENTS

| 1,242,809 | A | * | 10/1917 | Irwin | B66C 1/34 244/137.3 |
| 1,368,647 | A | | 2/1921 | Myers | |
| 1,546,208 | A | * | 7/1925 | Cunningham | E21B 19/04 24/599.5 |
| 1,626,865 | A | * | 5/1927 | Neilson | E21B 19/04 24/599.7 |

(Continued)

FOREIGN PATENT DOCUMENTS

GB 310213 A 4/1929

OTHER PUBLICATIONS

Ozsoy, Sevda, International Search Report, dated Mar. 17, 2017, 3 pages, European Patent Office, Rijswijk, Netherlands.

*Primary Examiner* — Paul T Chin
(74) *Attorney, Agent, or Firm* — Henricks Slavin LLP

(57) ABSTRACT

A device for lifting and transporting a load attached by a sling includes a hook comprising a throat opening intended to receive a loop on a sling. The device includes a latch that can pivot between an open position and a closed position in which said throat opening is obstructed. The device includes a locking device including a locked position in which said locking device prevents the latch from turning in the closed position, and an unlocked position in which the latch can rotate; a lever including a loaded position in which said lever holds the locking device in the locked position and a released position in which said lever does not hold said locking device. A rotation of the latch from the closed position to the open position triggers the lever from the loaded position to the released position.

14 Claims, 6 Drawing Sheets

(56) References Cited

U.S. PATENT DOCUMENTS

Figure 2A:
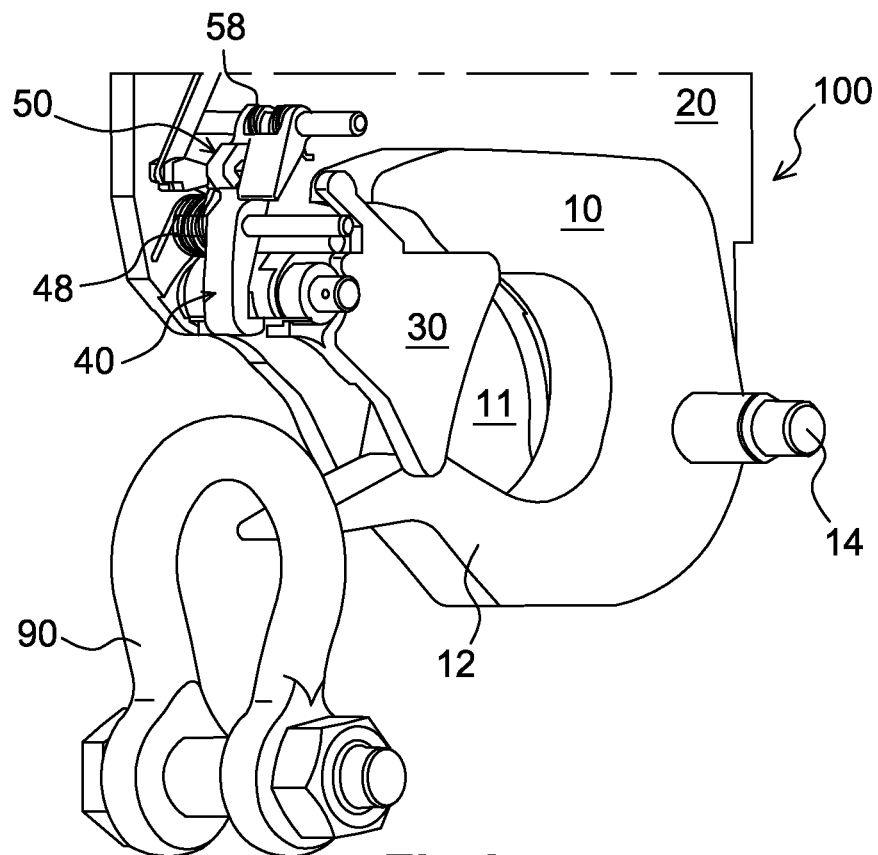

| | | | | |
|---|---|---|---|---|
| 1,626,866 A | * | 5/1927 | Neilson | E21B 19/04 24/599.7 |
| 2,027,376 A | * | 1/1936 | Grau | E21B 19/04 294/82.2 |
| 3,061,355 A | * | 10/1962 | Cozzoli | B64D 1/22 258/1.2 |
| 3,224,804 A | * | 12/1965 | Campbell | B66C 1/34 294/82.33 |
| 3,533,655 A | * | 10/1970 | Frank | A62B 1/04 294/82.34 |
| 3,807,784 A | * | 4/1974 | Laky | B66C 1/34 294/82.33 |
| 3,926,467 A | | 12/1975 | Crissy et al. | |
| 4,093,293 A | * | 6/1978 | Huggett | F16G 15/04 114/113 |
| 4,358,146 A | * | 11/1982 | Goudey | B66C 1/34 294/82.27 |
| 4,678,219 A | * | 7/1987 | Smith | B66C 1/34 294/82.33 |
| 2009/0072562 A1 | * | 3/2009 | Brunner | B66C 1/34 294/82.2 |

* cited by examiner

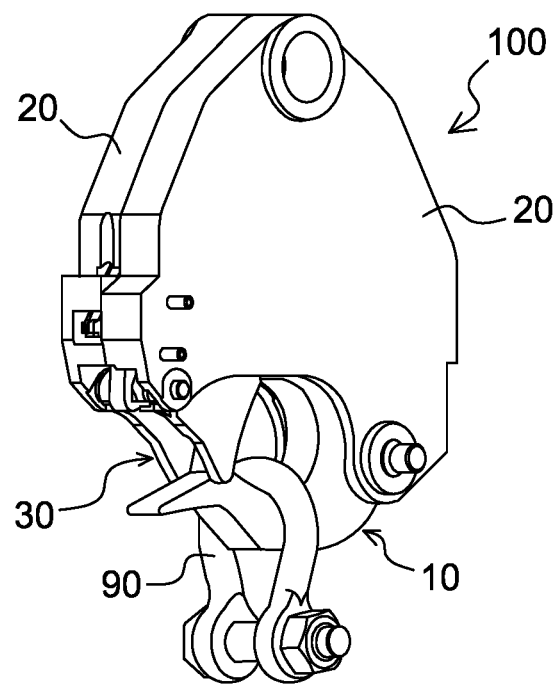
Fig.1
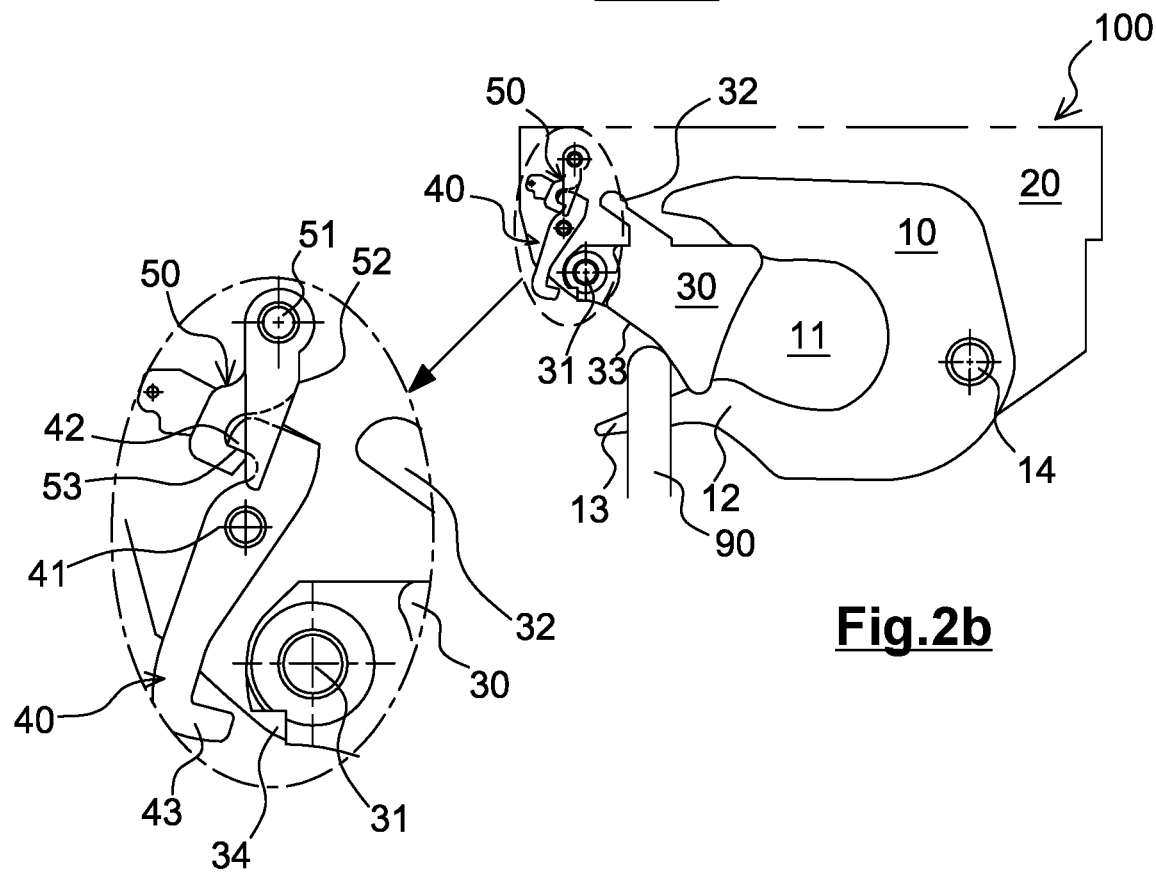
Fig.2b
Fig.2c

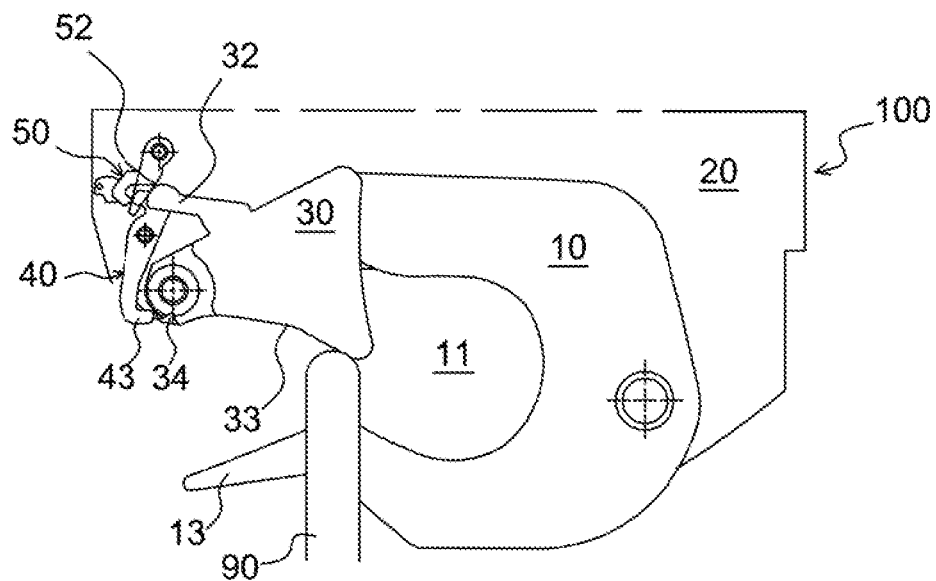
Fig.4
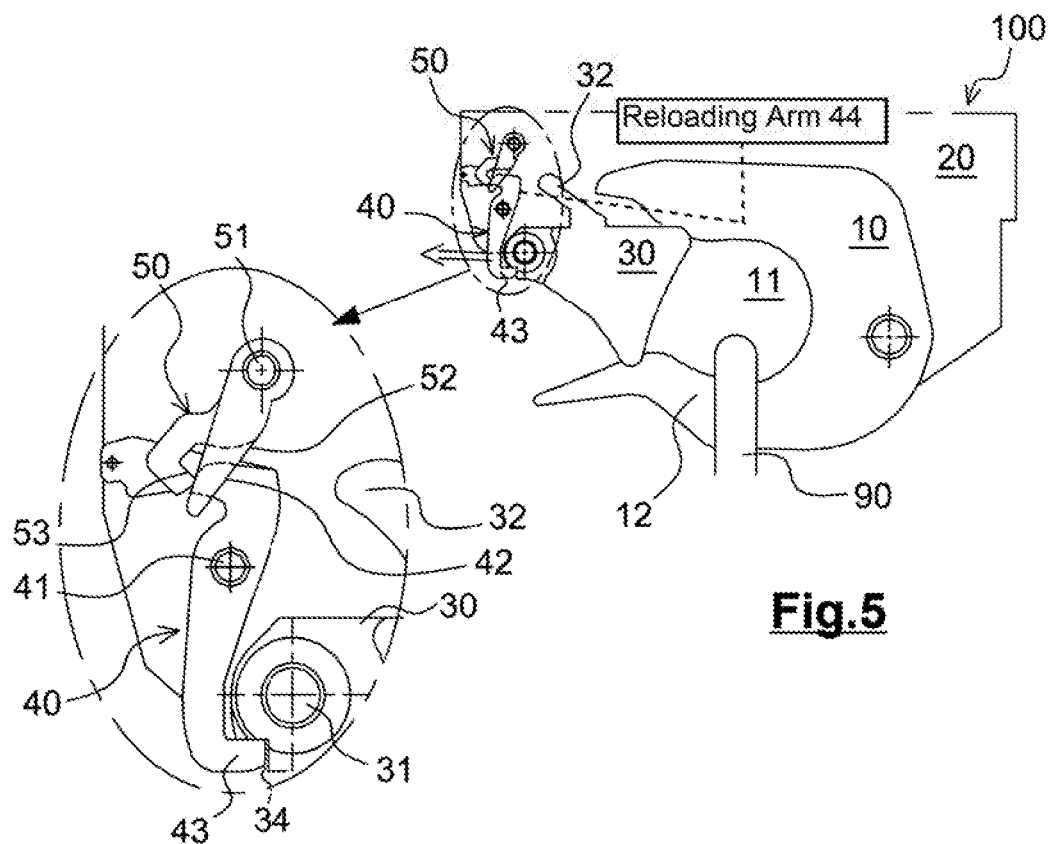
Fig.5
Fig.5a

HOOKING DEVICE FOR LIFTING LOADS COMPRISING A SECURE RATCHET

CROSS REFERENCE TO RELATED APPLICATIONS

This application is a National Stage of International Application No. PCT/FR2016/053091, filed Nov. 25, 2016, which claims priority to FR1561493, filed Nov. 27, 2015, the entire contents of each of which are incorporated herein by reference.

This invention is for the domain of the lifting and transportation of loads using a sling.

More specifically, the invention covers an attachment device from which a load can be suspended in a sling during lifting or transportation, in particular by helicopter.

It is known that loads can be transported suspended in a sling underneath a helicopter.

Such a solution is frequently used when a load cannot be attached in a hold or the helicopter is not intended to land at the point of departure or arrival.

In this case, the sling is attached to the structure of the helicopter by means of an attachment device in which a loop or a ring at the end of the sling is placed.

In this situation, the attachment device is an important component for the safety of the attachment and transportation operations.

The attachment device must in particular allow for the sling to be attached quickly and safely, and it must be possible to quickly release the load in case of emergency, for example a loss of power to the helicopter's engines, without it being possible for the ring on the sling that is attached on the hook of the attachment device to accidentally be released, even if the load swings.

These safety aspects have given rise to many solutions and the hook, which is a component that must open to attach the loop or the ring, is generally closed by a mobile latch that retracts to allow the ring to pass and extends to prevent it from being released without a specific action by an operator.

In a known situation, the latch is simply articulated on a bracket on the hook and held against an internal side at the end of the hook by a spring. In this configuration illustrated in the U.S. Pat. No. 3,926,467, the ring on the sling is introduced on the hook by pushing on the latch that retracts when the ring enters and returns to its position when the ring is inside the hook.

In such a case, it is relatively simple to attach the sling to the attachment device, there is a significant risk that, when the suspended load moves, the ring may lift the latch and come off the hook. This phenomenon is frequently referred to by the expression 'roll out'.

To avoid this phenomenon of undesired unhooking, a known method is to remove the latch and implement a mechanism on the hook to place the ring on the hook in an open position and to close the hook once the ring is in place. This solution, which prevents the roll out phenomenon, entails more complex attachment operations, as they require the use of two hands; one hand to open and close the hook and one hand to attach the ring on the hook, which does not favor a quick action and prevents a load from being attached at a distance using a pole.

Another known solution is to place a locking lever on the latch to prevent any accidental opening. This solution once again requires two hands to attach the ring and a pole cannot be used.

One of the objectives of this invention is to provide an attachment device including a latch that eliminates the risk of accidental unhooking of the sling whilst allowing for the sling to be attached on the device with one hand or by using a pole.

DESCRIPTION

To this end, the inventive device for the lifting and transportation of a load attached using a sling includes a hook, on which a throat opening is intended to receive a loop or hook on a sling and includes a latch.

The latch can rotate around a hinge pin for the latch between an open position in which the throat opening on the hook is open and a closed position in which the throat opening is obstructed.

The device also includes:
a locking device including a locked position in which said locking device prevents the latch from turning in the closed position for said latch, and including an unlocked position in which the latch can rotate;
a lever including a loaded position in which said lever holds the locking device in the locked position and a released position in which said lever does not hold said locking device, which is moved to the locked position by a locking device spring;
and in which a rotation of the latch from the closed position to the open position triggers the lever to move from the loaded position to the released position.

In this manner, the invention makes it possible to transport a load using a sling under a helicopter without a risk of the accidental release of the sling.

Furthermore, a sling can be attached to the device using just one hand and can easily be performed using a pole.

In perfected embodiments, the device includes all or some of the following characteristics:
the latch includes a striker plate arranged on said latch to allow for the striker to connect with said striker plate, in the closed position of said latch, only when the latch is in the closed position;
a locking device spring applies pressure to return the latch to said closed position;
in the loaded position, a restraint in the locking device rests on the support surface of the lever to hold said locking device in the open position;
when the latch pivots on the latch hinge pin it drives a cam that acts on a ramp on the lever to move said lever from the loaded position when the latch is in the closed position to a released position when the latch is pivoted to the open position;
the locking device is assembled to pivot in such a manner that the striker is opposite the striker plate when the latch is in the closed position and such that said striker enters into said striker plate when the locking device is pivoted around a locking device hinge pin;
in an embodiment including the restraint for the locking device to hold the locking device in an unlocked position and the cam that acts on the lever ramp, the lever is assembled to pivot in such a manner that in the loaded position the restraint is resting on the bearing surface when the latch is in the closed position, and pivots on a lever hinge pin to move the bearing surface and release the restraint;
in a specific embodiment, the locking device is assembled on a slide in such a manner that the striker is opposite the striker plate when said latch is in the closed position and such that said striker enters into said striker plate by a movement in a substantially linear direction in relation to the locking device;

in an embodiment of the invention including the restraint for the locking device to hold the locking device in an unlocked position and the cam that acts on the lever ramp, the lever is assembled on a slide in such a manner that in the loaded position the restraint is resting on the bearing surface when the latch is in the closed position, and moves in a linear manner to move the bearing surface and release the restraint when the latch is pivoted in the open position of said latch;

a reloading control is arranged to move the locking device, when the latch is locked, and to drive the movement of the lever, under the effect of a lever spring, from the released position to the loaded position;

a covering structure for the device includes two flanges between which the hook, latch, locking device and lever are arranged;

the latch has a contact surface on which a loop or ring at the end of a sling slides when said loop or ring is attached on the arm of the hook, and turns the latch to the open position;

the latch's open position corresponds with pivoting said latch upwards, in the working position of the device, to allow it to switch to the bottom of the hook to uncover the throat opening without unlocking the latch;

a position detector for the locking device sends information on whether the latch is in the locked or unlocked position.

Figure 3:
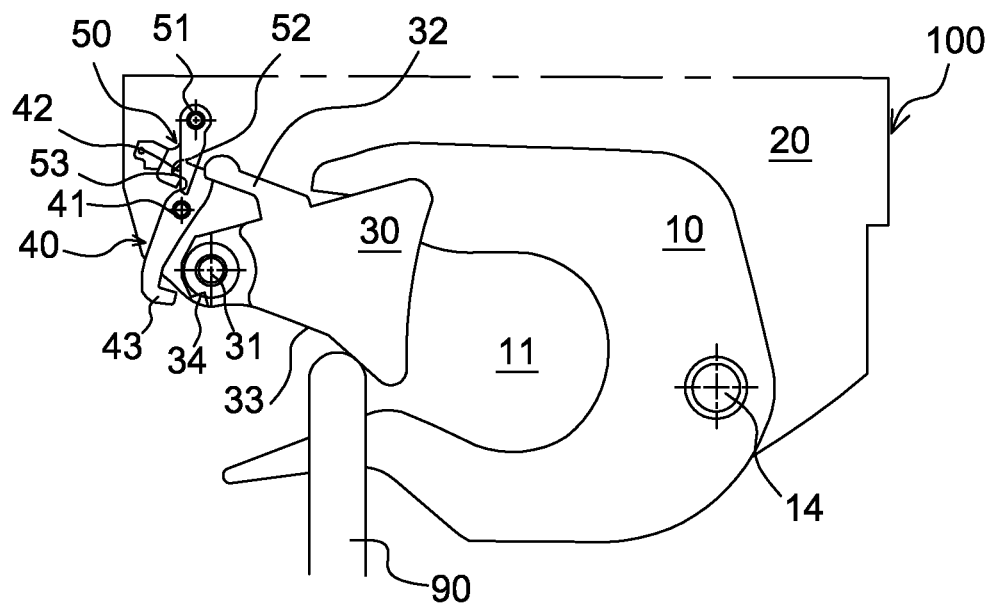
Figure 6A:
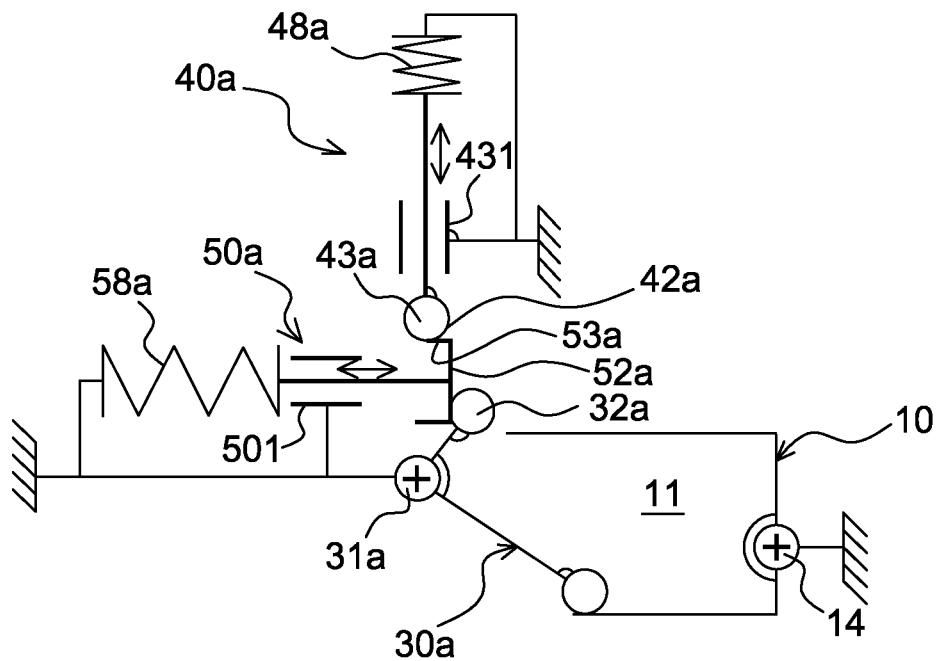
Figure 6B:
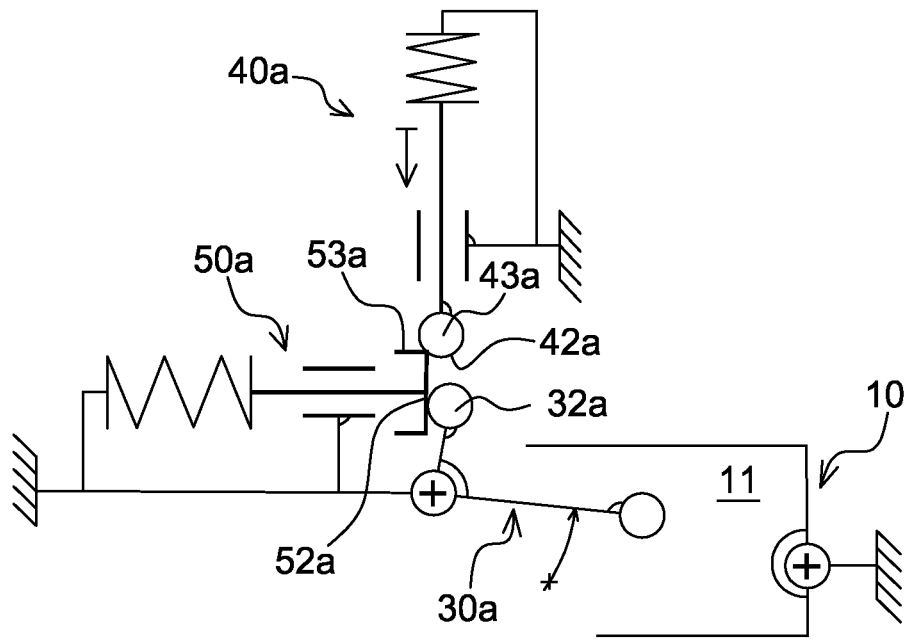
Figure 6C:
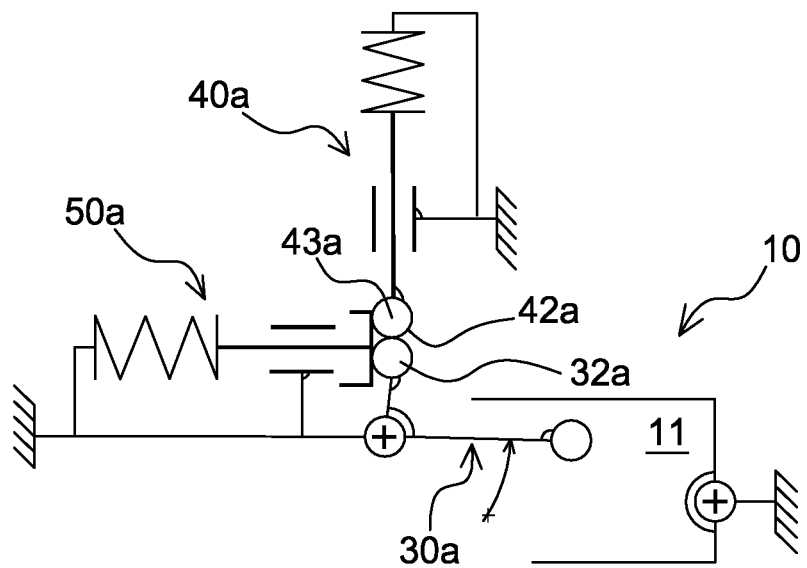
Figure 6D:
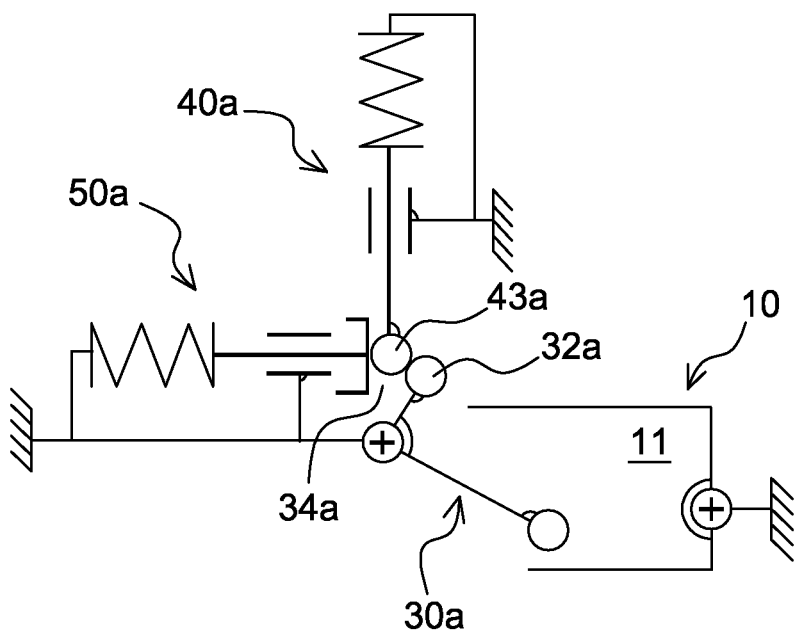
Figure 6E:
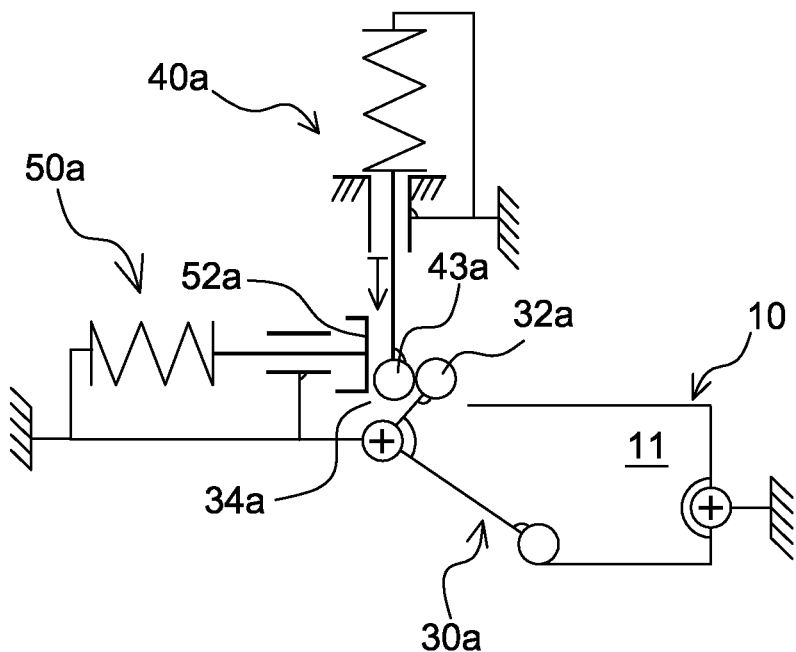
Figure 6F:
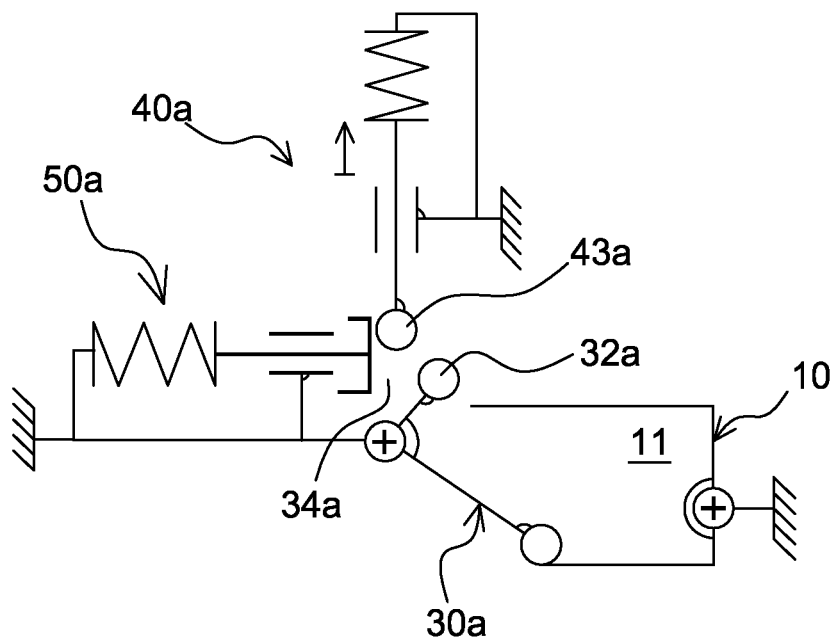

The invention will be better understood after reading the following description and examining the accompanying Figures. These are provided solely by way of a non-limiting example of the invention. The Figures show:

FIG. 1: an isometric view of an attachment device according to a first embodiment of the invention with a ring on a sling attached on the hook of the device;

FIG. 2a: a cutaway isometric view of the attachment device from FIG. 1, a lateral flange being removed to show the components of the device with the ring on the sling presented to attach the hook, and in which the latch is lowered into a closed and unlocked position;

FIG. 2b: a side view in the configuration shown in FIG. 2a;

FIG. 2c is a partial close-up of FIG. 2b with the locking device loaded;

FIG. 3: a similar side view to FIG. 2b but in which the ring on the sling is partially attached to the hook and the latch is partially raised towards an open position;

FIG. 4: a similar side view to FIGS. 2b and 3 in which the ring on the sling is attached by raising the latch and in which the latch is raised in an open and unlocked position and the lever is in the released position;

FIG. 5: a similar side view to FIGS. 2b, 3 and 4 in which the ring on the sling is completely attached on the hook and in which the latch is lowered into a closed and locked position;

FIG. 5a is a partial close-up with the locking device released and the latch locked;

FIGS. 6a to 6f: a schematic illustration of a second embodiment of the invention, the Figures show an operational sequence in which the latch is closed and unlocked in FIG. 6a, the latch is partially open in FIG. 6b, the latch is fully open in FIG. 6c, the latch is closing and locking in FIG. 6d, the latch is closed and locked in FIG. 6e, and the latch is closed and in the process of locking in FIG. 6f.

The attachment device of this invention is a device that can in particular be implemented for transporting and releasing loads by helicopter.

In the description, the expression "sling loop" and "ring" shall be used indifferently to describe the end on the sling carrying the load that is attached to the device, regardless of the shape of this end part.

The attachment device 100 from FIG. 1 and FIGS. 2a, 2b, 2c and 3 to 5a includes principally:

A hook 10 in a throat opening 11 in which the hook attaches to a ring 90, a coupling ring in the illustrated example, a sling intended to carry a load, not shown, which must be transported;

A latch 30 that closes the throat opening 11;

A cage including two lateral flanges 20 held apart and fixed to each other by bolts and spacers, not shown, between said lateral flanges are arranged the hook 10 and the latch 30.

In FIG. 1, the ring 90 is attached in the throat opening 11 of the hook 10.

FIG. 2a shows an isometric view, and FIG. 2b shows a side-face view of the device 100, a lateral flange having been removed to show the arrangement of the components of the device located between the lateral flanges.

The lateral flanges 20 hold the hinge pins of the different mobile components that can turn between said lateral flanges, said hinge pins being perpendicular to an axial plane of the device 100 substantially parallel to the lateral flanges.

Therefore, the hook 10 is able to turn around a hook hinge pin 14. Said hook hinge pin makes it possible to turn the hook 10 when the load must be released, which is achieved by unlocking the rotation of said hook. The manner in which the locking of the hook 10 is achieved during transportation of a load, and the unlocking to release said load, and the components involved are not shown and are not described in this application that relates more specifically to the latch 30 and the means for securing the operation of said latch.

The latch 30, which turns around a latch hinge pin 31 has an angular profile when shown in a side-face view. The latch is returned to the closed position, illustrated in FIG. 1, by a latch spring that is not shown in the Figures.

In a known manner, the latch hinge pin 31 is located on an open side of the throat opening 11 and the latch 30 is sized such that in the closed position, it obstructs said throat opening and in the open position it uncovers a passage through the throat opening that is suitable for the placing of the ring 90 of the sling on the hook arm 12, when the hook is in the position in which it must carry a load.

It should be noted that in the embodiment and considering the relatively enveloping form of the hook 10, the latch is designed to allow for switching to the bottom of the hook, such switching is required to release the load and to free the throat opening 11 of the obstruction caused by the latch 30 in the position for carrying the load.

The device 100 also includes, between the flanges 20, a locking device 40 and a lever 50 implemented to lock the latch 30 in a closed position.

Therefore, the locking device 40 is able to turn around a locking device hinge pin 41.

At one end, located with respect to the locking device hinge pin on the side in which the latch hinge pin 31 is positioned, the locking device includes a striker 43.

In the unlocked position, shown in FIG. 2b, the locking device is switched around the locking device hinge pin 41 in such a manner that the striker 43 is released from a striker plate 34 of the latch 30. The latch 30 is therefore only held in position by the latch spring, and can be opened by pressure on the latch that is adequate to counter the pressure applied by said latch spring.

The opposite of this closed, unlocked configuration for the latch is a closed, locked position of the latch 30, as shown in FIG. 5.

In the closed, locked position, the striker 43 is against the striker plate 34 on the latch 30, and the locking device 40 prevents the latch from turning around the latch hinge pin 31.

To ensure that the latch 30 is in the closed, locked position, the locking device 40 is itself pushed into the locked position by the locking device spring 48.

At a second end, the locking device 40 includes a locking device restraint 42.

The lever 50 is able to turn around a lever hinge pin 51.

The lever 50 has a bearing surface 53 intended to hold the locking device restraint 42 when the locking device 40 is in the unlocked position, FIG. 2b, and prevents the locking device from switching to the locked position, FIG. 5.

The lever 50 also includes a ramp 52 arranged to interact with a cam 32 of the latch 30. The lever is pushed towards the cam 32 by a lever spring 58, which is shown in the FIG. 2a.

When the lever 50 is free to pivot around the lever hinge pin 51, said lever pivots towards the cam 32. Therefore, when the latch 30 is in the closed position, the lever 50 is in a position in which the locking device restraint 42 is pressing on the bearing surface 53, or is able to assume this position. When the latch 30 is in an open position, in practice considered as open when a ring 90 can pass, the lever 50, pushed by the cam 32 acting on the ramp 52, is moved such that the locking device restraint 42 can no longer go onto the bearing surface 53.

The principles of the secure latch device shall be better understood by the description of the operation of the latch as broken down in FIGS. 2b, 3, 4 and 5.

In FIG. 2b, the latch 30 is in a closed and unlocked position, which corresponds to a loaded position for lever 50 and the device.

In this position, the locking device 40 is held unlocked by the locking device restraint 42 that rests on the bearing surface 53 of the lever that prevents the locking device from switching and, therefore, prevents the striker 43 from contacting the striker plate 34 of the latch.

This loaded position for the lever 50 is possible due to the relative position of the lever ramp 52 and the latch cam 30, wherein said cam is not resting on said ramp.

In FIG. 2b, the ring 90 is shown in front of the opening of the hook 10.

When the locking device 40 is in this position, it is possible to pivot the latch, which is unlocked, by countering the pressure of the latch spring that returns said latch to the closed position. In FIG. 3, the latch 30 is in a partially open position, said latch is raised by the sole effect of introducing the sling loop 90 that is pushed on the lip 13 of the hook 10. In the resulting turning motion of the latch 30, the cam 32 is brought towards the ramp 52 of the lever 50, without this intermediate position acting on said ramp.

In FIG. 4, the latch 30 is in a partially open position or an open position, said latch is lifted by the introduction of the sling loop 90 above the position illustrated in FIG. 3. The resulting turning motion of the latch 30 is, in this position, sufficient that the cam 32 acts on the ramp 52 and pushes the lever 50 that releases the locking device 40.

When the latch is in this position, the striker 43 is not in contact with the striker plate 34 that is not positioned in relation to the striker, which is a position that only occurs when the latch is in the closed position.

It should be noted that, as illustrated in FIG. 4, the pivoting of the locking device 40, the bearing surface 53 and the lever 50 can no longer place itself under the locking device restraint 42.

In FIG. 5, the ring 90 is inside the throat opening 11 of the hook and the latch 30 is back in the closed position under the effect of the latch spring.

Furthermore, despite the withdrawal of the cam 32, which is no longer resting on the ramp 52, the lever has not returned to its initial position, leaving the locking device 40 free to pivot under the effect of the locking device spring 48. The striker 43 of the locking device is in contact with the striker plate 34 that was returned to its position with regard to the striker when the latch pivoted when the latch returned to the closed position.

In FIG. 5, the latch is therefore closed and locked, with the ring 90 in the throat opening 11 where it is held by the locked latch.

As the latch 30 is locked in the closed position, it is no longer possible for the loop or ring of the sling to be accidentally released from the device, regardless of how the load moves.

The roll out phenomenon is thus avoided.

When the device is in the configuration shown in FIG. 5, with the latch closed and locked, it is possible to return to the closed and unlocked position in FIGS. 2a and 2b by reloading the device.

To do so the locking device just needs to be pivoted as indicated by the arrow in FIG. 5, that is to say, to remove the striker from the striker plate.

This movement unlocks the latch and allows the lever 50 to pivot, under the effect of the lever spring 58, to return the bearing surface 53 to under the locking device restraint 42 and thereby prevent the locking of the latch so that the cam 32 shall not have pushed back the lever 50.

Reloading can be carried out by mechanical control such as a reloading arm 44 (shown schematically in FIG. 5) that the operator can access on the device or using an electrical control by means of a switch, for example an electromagnet, that is not shown, which can be remote controlled by an operator in the helicopter for example.

In an unillustrated embodiment, the device is equipped with a locking indicator that can be used to ensure that the latch is effectively locked and not just closed as could be seen by its visible position.

Such a locking indicator includes for example a colored indicator light, for example red or another characteristic color, which is turned on by the locking device 40 and that is only visible on one side of the device when the striker 43 is in contact with the striker plate 34. The indicator light may be visible through a window in a flange or another area of the device, or include a mobile component that is protruding and visible on one side of the device when the striker is not in contact with the striker plate and that is hidden and invisible otherwise, or inversely.

As an alternative or in addition, a position detector for the striker is arranged on the device to send a locking signal to an operator on the ground or in the helicopter. The signal can be sent by any kind of wired or wireless connection that is compatible with the operating conditions of the device.

In a wireless transmission form, the position detector powers an indicator light on the device for example to warn the operator when the latch is not locked.

FIGS. 6a to 6f provide a schematic illustration of the operation of a device 100 according to another embodiment of the invention.

In a second version of the invention, the locking device 40*a* and the lever 50*a* perform the same functions reciprocally as the locking device 40 and the lever 50 in the previous embodiment. In a general manner, the index (a) added to a marker in the Figures in the second embodiment refers to a component with the same function as the component with the same reference without the index in the first embodiment.

In this second embodiment, the striker 43*a* is triggered by a linear movement of the locking device 40*a* and the bearing surface 53*a* of the restraint 42*a* is also moved by the linear movement of the lever 50*a*. Advantageously, the sliding rails or the guides 431, 501 guide the components with linear movements.

In reference to the operation description for the previous embodiment:

FIG. 6*a*: the latch 30*a* is closed and unlocked when the device is in the loaded position. The striker 43*a* of the locking device 40*a* is resting on the restraint 42*a*, formed at one end of said striker, on the bearing surface 53*a* of the lever 50*a* that prevents the striker from blocking the turning of the latch 30*a* on the latch axle 31*a*. The latch 30*a*, which is held in a closed position by the pressure from the elastic component 54*a* pushing back the cam 32*a* by pressing on a surface of the ramp 52*a* of the lever 50*a*, is therefore free to open;

FIGS. 6*b* and 6*c*: the latch 30 is partially open (the loop of the sling is not shown) in FIG. 6*b* and the lever 50*a* in a released position in FIG. 6*c*. Under the effect of the forced opening of the latch, the cam 32*a* pushes back on the lever 50*a* by resting on the ramp 52*a* in such a manner that the bearing surface 53*a* of said lever retracts and the striker 43*a*, which is moved by the locking device spring 48*a*, is only held in the unlocked position by a surface of the cam 32*a* on the latch 30;

FIGS. 6*e* and 6*d*: when the unillustrated sling loop is in the hook 10, the latch 30*a* has returned to its closed position, partially in FIG. 6*d*. When the latch is returned to the closed position, the striker 43*a* is pushed, under the pressure from locking device spring 48*a*, into the striker plate 34*a*, which has the effect of locking the latch and securing the closure. In this embodiment, the striker plate for the latch corresponds to a space formed between the cam 32*a* and the ramp 52*a* into which the end of the striker 43*a* is positioned, FIG. 6*e*.

In this embodiment, the device is reloaded by raising the locking device 40*a*, in the direction of the arrow in FIG. 6*f*, which allows the lever 50*a* to return to its initial position in FIG. 6*a* where the restraint 42*a* is once again in a position where it can rest on the bearing surface 53*a* which is returned to its initial position under the effect of lever spring 58*a*.

The invention is not restricted to the embodiments that have been described here.

In particular, the two embodiments described here can be combined, for example by combining a pivoting locking device with a sliding lever or by combining a sliding locking device with a pivoting lever.

A person skilled in the art may in a general manner implement other forms of locking device and lever in so much as, according to the invention, when the lever is in a loaded position, the latch may be freely turned and that when the lever is in a released position, where the releasing is achieved by pivoting the latch to an open position, the locking device is immobile and locks the latch when it returns to the closed position.

In particular, the examples described use the transmissions of direct movements, but it is also possible to implement the transmissions using intermediary mobile parts such as cams, rods, gear wheels, etc. to obtain the movements and effects sought between the latch, the locking device and the lever.

In this manner, the invention makes it possible to create a secure device to transport a load using a sling under a helicopter without a risk of the accidental release of the sling.

Furthermore, a sling can be attached to the device using just one hand and can easily be performed using a pole.

The invention claimed is:

1. A device for lifting and transporting a load attached by a sling including a hook, of which a throat opening is intended to receive a loop or a ring on a sling, and including a latch that can rotate on a latch hinge pin between an open position in which the throat opening is unobstructed and a closed position in which said throat opening is obstructed, characterized in that said device includes:
    a locking device including a locked position in which said locking device prevents the latch from rotating in the closed position for said latch, and including an unlocked position in which the latch can rotate;
    a lever including a loaded position in which said lever holds the locking device in the locked position and a released position in which said lever does not hold said locking device, which is driven to the locked position by a locking device spring; and characterized in that a rotation of the latch from the closed position to the open position triggers the lever from the loaded position to the released position.

2. A device according to claim 1 in which the latch includes a striker plate arranged on said latch to allow for the striker to connect with said striker plate, in the closed position of said latch, only when the latch is in the closed position.

3. A device according to claim 2 in which the locking device is assembled on a slide in such a manner that the striker is opposite the striker plate on the latch when said latch is in the closed position and such that said striker enters into said striker plate by a movement in a substantially linear direction in relation to the locking device.

4. A device according to claim 1 in which a latch spring applies pressure to return the latch to the closed position.

5. A device according to claim 1 in which, in the loaded position, a restraint of the locking device is resting on a bearing surface of the lever to hold said locking device in the unlocked position.

6. A device according to claim 1 in which when the latch pivots on the latch hinge pin it drives a cam that acts on a ramp on the lever to move said lever from the loaded position when the latch is in the closed position to a released position when the latch is pivoted to the open position.

7. A device according to claim 1 in which the locking device is assembled to pivot in such a manner that the striker is opposite the striker plate when the latch is in the closed position and such that said striker enters into said striker plate when the locking device pivots around a locking device hinge pin.

8. A device according to claim 1 in which a reloading control is arranged to move the locking device, when the latch is locked, and to drive the movement of the lever, under the effect of a lever spring, from the released position to the loaded position.

9. A device according to claim 1 in which a structure envelopes the device including two flanges between which are arranged the hook, the latch, the locking device and the lever.

10. A device according to claim 1 in which the latch has a contact surface on which a loop or ring at the end of a sling slides when said loop or ring is attached on the arm of the hook, and pivots the latch to the open position.

11. A device according to claim 1 in which the open position of the latch corresponds with pivoting said latch upwards, in the working position of the device, to allow it to switch to the bottom of the hook to uncover the throat opening without unlocking the latch.

12. A device according to claim 1 in which a locking device position detector sends information on whether the latch is in the locked or unlocked position.

13. A device for lifting and transporting a load attached by a sling including a hook, of which a throat opening is intended to receive a loop or a ring on a sling, and including a latch that can rotate on a latch hinge pin between an open position in which the throat opening is unobstructed and a closed position in which said throat opening is obstructed, characterized in that said device includes:
- a locking device including a locked position in which said locking device prevents the latch from rotating in the closed position for said latch, and including an unlocked position in which the latch can rotate;
- a lever including a loaded position in which said lever holds the locking device in the locked position and a released position in which said lever does not hold said locking device, which is driven to the locked position by a locking device spring;
- and characterized in that a rotation of the latch from the closed position to the open position triggers the lever from the loaded position to the released position, in which in said loaded position, a restraint of the locking device is resting on a bearing surface of the lever to hold said locking device in the unlocked position, and wherein, when the latch pivots on the latch hinge pin it drives a cam that acts on a ramp on the lever to move said lever from the loaded position when the latch is in the closed position to a released position when the latch is pivoted to the open position, and in which the lever is assembled to pivot in such a manner that in the loaded position the restraint is resting on the bearing surface when the latch is in the closed position, and pivots on a lever hinge pin to move the bearing surface and release the restraint.

14. A device for lifting and transporting a load attached by a sling including a hook, of which a throat opening is intended to receive a loop or a ring on a sling, and including a latch that can rotate on a latch hinge pin between an open position in which the throat opening is unobstructed and a closed position in which said throat opening is obstructed, characterized in that said device includes:
- a locking device including a locked position in which said locking device prevents the latch from rotating in the closed position for said latch, and including an unlocked position in which the latch can rotate;
- a lever including a loaded position in which said lever holds the locking device in the locked position and a released position in which said lever does not hold said locking device, which is driven to the locked position by a locking device spring;
- and characterized in that a rotation of the latch from the closed position to the open position triggers the lever from the loaded position to the released position, in which in said loaded position, a restraint of the locking device is resting on a bearing surface of the lever to hold said locking device in the unlocked position, and
- wherein, when the latch pivots on the latch hinge pin it drives a cam that acts on a ramp on the lever to move said lever from the loaded position when the latch is in the closed position to a released position when the latch is pivoted to the open position, and
- in which the lever is assembled on a slide in such a manner that in the loaded position the restraint is resting on the bearing surface when the latch is in the closed position, and moves in a linear manner to move the bearing surface and release the restraint when the latch is pivoted in the open position of said latch.

* * * * *

UNITED STATES PATENT AND TRADEMARK OFFICE
CERTIFICATE OF CORRECTION

Page 1 of 1

PATENT NO. : 10,532,914 B2
APPLICATION NO. : 15/779542
DATED : January 14, 2020
INVENTOR(S) : Christophe Autissier and Guillaume Meyniel It is certified that error appears in the above-identified patent and that said Letters Patent is hereby corrected as shown below:

On the Title Page

Item (73) Assignee, Change "LISI AEROSPACE, Paris" to -- LACE, Saint-Maur --

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*